Aug. 16, 1932.     O. ERNST ET AL     1,872,432
PROCESS OF SEPARATING CONDENSATION PRODUCTS OF ACETYLENE AND AMMONIA
Filed Dec. 19, 1928
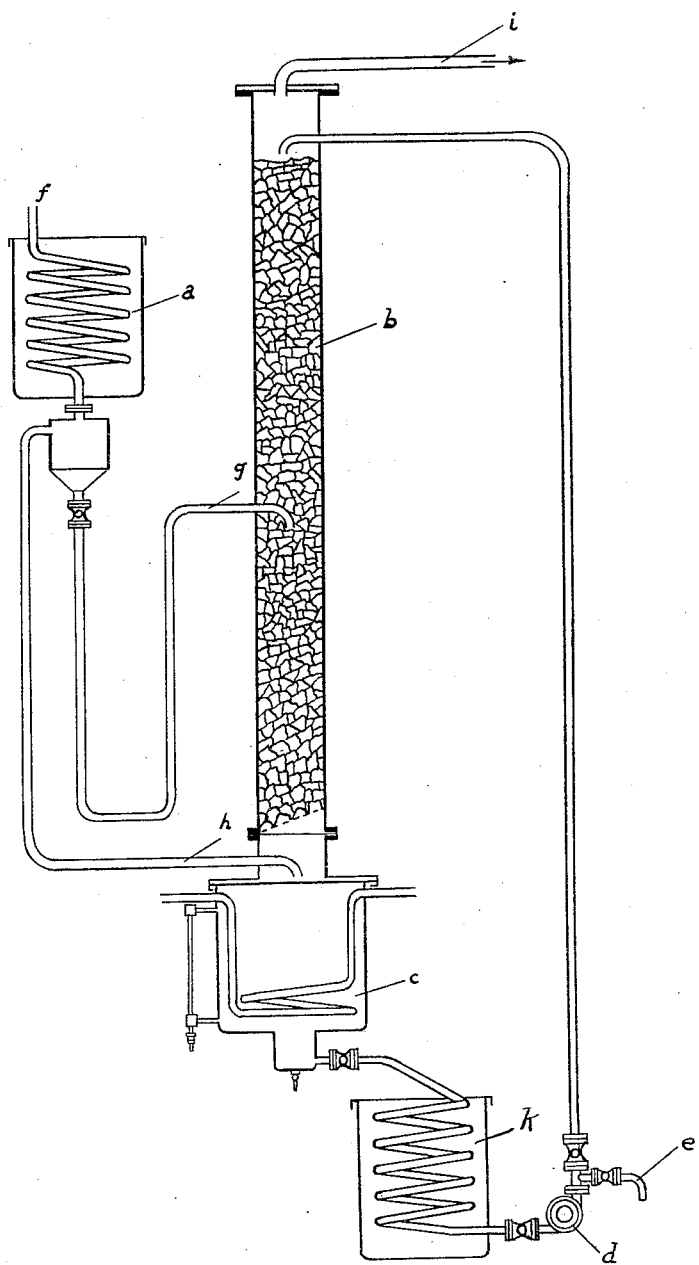
INVENTORS
OTTO ERNST
BY    OTTO NICKODEMUS
ATTORNEY Patented Aug. 16, 1932

1,872,432

UNITED STATES PATENT OFFICE

OTTO ERNST AND OTTO NICODEMUS, OF FRANKFORT-ON-THE-MAIN-HOCHST, GERMANY, ASSIGNORS TO I. G. FARBENINDUSTRIE AKTIENGESELLSCHAFT, OF FRANKFORT-ON-THE-MAIN, GERMANY, A CORPORATION OF GERMANY

PROCESS OF SEPARATING CONDENSATION PRODUCTS OF ACETYLENE AND AMMONIA

Application filed December 19, 1928, Serial No. 327,174, and in Germany December 23, 1927.

The present invention relates to a new process of separating condensation products obtained by catalytic condensation of acetylene and ammonia containing nitrogen and unattacked acetylene and ammonia, from hydrogen and other contaminating gases.

When condensing acetylene and ammonia by means of a catalyst, preferably while using an excess of ammonia, a mixture of vapors and gases is produced consisting of nitrogenous condensation products, unattacked acetylene and ammonia and, moreover, of some hydrogen formed during the reaction and small quantities of contaminated gases. We have now found that the reaction products and gases contained in the said mixture can be isolated from each other and the acetylene and ammonia recovered from gases, thus rendering the process highly economical, by using as washing agent the reaction products which are formed by the condensation of acetylene and ammonia and which constitute liquid bodies at ordinary temperature. In order to avoid that any quantity of the extracting agent be lost, it is advantageous to effect the washing operation at a temperature below 0° C. There may be used as washing agents both the crude condensation product and certain fractions thereof; thus it has been found that the fractions boiling at a temperature of 100° C. and above are very suitable for washing and liquefying the vapors leaving the reaction vessel, while the fractions boiling below 120° C. have proved to be most suitable for the washing of the waste gases and recovering the acetylene and ammonia.

The washing-out process can be operated according to any of the known methods and, in like manner, the extracting agent may be boiled out in any known manner. It is advantageous to carry out the operations of preparing the liquid reaction-products and of recovering the unattacked acetylene and ammonia with the aid of two separate systems, the first operation to be carried out, for instance, according to the gas-circuit system and the second operation without using the circuit system.

If it is intended to recover from the waste gas acetylene and ammonia separately, the process may, for instance, be carried out in such a manner that the waste gas is washed free from the ammonia by causing water to trickle over the gas and then washing it out by means of the nitrogenous washing agent whereupon the acetylene is recovered by boiling out the washing agent and the ammonia by expelling the ammoniacal liquor. The waste gas may, however, also be washed out in the state in which it leaves the apparatus by means of one of the nitrogenous reaction products in question and a mixture of acetylene and ammonia be obtained by boiling out the washing agent, which mixture may then be re-introduced immediately into the contact chamber.

In the above described manner it is possible to recover the liquid nitrogenous condensation products entirely and from the waste gas 95-98 per cent of the acetylene and ammonia contained therein, and moreover to obtain a highly valuable hydrogen of 85-90 per cent strength which may be utilized for technical purposes. The possibility of using the reaction products which are formed in the course of the new process for washing out the reaction products is particularly advantageous because in this manner no substances are introduced which are unsuitable for treatment by the new process and which would have to be again eliminated and might exercise a detrimental action on the contact substance used. The quantity of washing agent lost is very insignificant because its vapors which are carried along during the boiling-out operation are always returned into the process and are thus saved.

The following example serves to illustrate our invention but is not intended to limit it thereto.

A column, whose upper part is provided with a condenser jacket and which is filled with a filling material, is trickled over at a temperature of −10° C. with a fraction, boiling at between 120° C. and 300° C., of the nitrogenous reaction products mainly containing homologues of pyridine besides small amounts of high-boiling nitrils obtainable by condensing acetylene and ammonia according to the process described in the co-pending U. S. Patent application Ser. No. 244,560, filed on January 4, 1928 in the name of Otto Nicodemus, and the hot mixture of the reaction vapors and gases leaving the contact chamber is introduced into the column according to the counter-current principle. The washing agent, after having absorbed all of the nitrogenous condensation products which are liquid at ordinary temperature, and moreover acetylene and ammonia, is boiled out and thus freed from the dissolved gases and, after cooling, it is partly drawn off as crude product or partly utilized for repeatedly irrigating the column. The waste gas leaving the column, which, besides the unattacked acetylene, contains the excess of ammonia and the hydrogen which as formed, is trickled over in a tower provided with a double jacket, cooled with a cooling liquor and filled with a loading material, with a fraction, boiling at between 60° C. and 120° C., of nitrogenous condensation products from acetylene and ammonia mainly containing primary, secondary and tertiary amines, nitrils and small amounts of low-boiling bases of pyridine. In this manner there are washed out of the gas 95–96 per cent of the acetylene and ammonia contained therein, while hydrogen of 85–90 per cent strength leaves the washing tower. The acetylene and ammonia which has dissolved in the washing agent is recovered by extracting it by boiling and is then conducted into the contact-chamber. The quantity of the washing agent lost is very small, because the only possible source of loss is the hydrogen which leaves the second irrigating tower; however, these losses may almost entirely be avoided by washing the hydrogen with water or treating it with some highly active absorbent.

The annexed drawing serves to illustrate more clearly the execution of the process, without limiting the present invention to it.

The reaction gases and vapors leaving the contact oven enter the refrigerator $a$ at $f$. The crude condensation product runs through the pipe $g$ into the washing and boiling column $b$, from there into the boiling pot $c$ and finally into the second refrigerator $k$. A part of the condensation products is reconducted into the column $b$ by the irrigating pump $d$. The remaining part is drawn off at $e$. The reaction gases leave the refrigerator $a$ through the pipe $h$. If required, they are washed with water. Then they are caused to pass, together with the gases set free in the boiling pot $c$, through the column $b$. They leave the apparatus at $i$ being completely washed out.

We claim:

1. The process of separating condensation products obtained by catalytic condensation of acetylene and ammonia, said products containing nitrogen and unattacked acetylene and ammonia, from hydrogen and other contaminating gases, which comprises washing out the gases and vapors leaving the reaction chamber by means of the liquid reaction products which are formed by the condensation.

2. The process of separating condensation products obtained by catalytic condensation of acetylene and ammonia, said products containing nitrogen and unattacked acetylene and ammonia, from hydrogen and other contaminating gases, which comprises washing out at a temperature between 0° and −20° C. the gases and vapors leaving the reaction chamber by means of the liquid reaction products which are formed by the condensation.

3. The process of separating condensation products obtained by catalytic condensation of acetylene and ammonia, said products containing nitrogen and unattacked acetylene and ammonia, from hydrogen and other contaminating gases which comprises washing out the gases and vapors leaving the reaction chamber by means of a fraction, boiling at between 65° C. and 120° C., of the liquid reaction products which are formed by the condensation.

4. The process of separating condensation products obtained by catalytic condensation of acetylene and ammonia, said products containing nitrogen and unattacked acetylene and ammonia, from hydrogen and other contaminating gases, which comprises washing out at a temperature between 0° C. and −20° C. the gases and vapors leaving the reaction chamber by means of a fraction boiling at between 65° C. and 120° C., of the liquid reaction products which are formed by the condensation.

5. The process of separating condensation products obtained by catalytic condensation of acetylene and ammonia, said products containing nitrogen and unattacked acetylene and ammonia, from hydrogen and other contaminating gases, which comprises first washing the gases and vapors leaving the reaction chamber with water and then washing them out by means of the liquid reaction products which are formed by the condensation.

6. The process of separating condensation products obtained by catalytic condensation of acetylene and ammonia, said products containing nitrogen and unattacked acetylene and ammonia, from hydrogen and other contaminating gases, which comprises first washing at a temperature of between 0° and −20° C. the gases and vapors leaving the reaction chamber with water and then washing them out by means of the liquid reaction products which are formed by the condensation.

7. The process of separating condensation products obtained by catalytic condensation of acetylene and ammonia, said products containing nitrogen and unattacked acetylene and ammonia, from hydrogen and other contaminating gases, which comprises first washing the gases and vapors leaving the reaction chamber with water and then with a fraction boiling at between 65° C. and 120° C. of the reaction products which are formed by the condensation.

8. The process of separating condensation products obtained by catalytic condensation of acetylene and ammonia, said products containing nitrogen and unattacked acetylene and ammonia, from hydrogen and other contaminating gases, which comprises first washing at a temperature of between 0° C. and −20° C. the gases and vapors leaving the reaction chamber with water and then with a fraction boiling between 65° C. and 120° C. of the reaction products which are formed by the condensation.

In testimony whereof we have hereunto set our hands.

OTTO ERNST.
OTTO NICODEMUS.